United States Patent

Hodge et al.

[11] Patent Number: 5,944,224
[45] Date of Patent: *Aug. 31, 1999

[54] INSULATED VESSEL WITH HANDLE AND DISPENSING SPOUT

[75] Inventors: Andrew Bert Hodge; John W. Lai, both of San Francisco, Calif.; Rodney Hal Monson, Winthrop Harbor, Ill.; Peter C. Simpson, Glencoe, Ill.; Thomas J. Melk, Chicago, Ill.

[73] Assignee: Outer Circle Products, Ltd., Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/820,306

[22] Filed: Mar. 18, 1997

[51] Int. Cl.$^6$ .......................................................... B64D 5/06
[52] U.S. Cl. ....................... 222/131; 222/185.1; 222/468; 222/470; 222/471; 222/482; 222/518
[58] Field of Search .................................. 222/131, 185.1, 222/468, 470, 471, 475.1, 482, 518, 494

[56] References Cited

U.S. PATENT DOCUMENTS

| | | |
|---|---|---|
| 10,036 | 9/1853 | Nichols ..................................... 222/470 |
| 193,016 | 7/1877 | McClave ............................. 222/471 X |
| D. 262,856 | 2/1982 | MacTavish et al. . |
| D. 268,469 | 4/1983 | Ruxton et al. . |
| D. 279,346 | 6/1985 | Ruxton . |
| D. 294,325 | 2/1988 | Fiore, Jr. . |
| D. 338,130 | 8/1993 | Costello . |
| 832,499 | 10/1906 | Nystrom et al. ..................... 222/518 X |
| 834,333 | 10/1906 | Stowby ................................... 222/468 |
| 3,146,913 | 9/1964 | Nagai .................................. 222/482 X |
| 3,204,822 | 9/1965 | Maillie ................................ 222/471 X |
| 3,401,850 | 9/1968 | Anderson ................................ 222/482 |
| 5,079,013 | 1/1992 | Belanger ............................. 222/482 X |

FOREIGN PATENT DOCUMENTS

| | | |
|---|---|---|
| 36-25669 | 2/1935 | Japan . |
| 39-03192 | 2/1939 | Japan . |
| 47-11647 | 10/1972 | Japan . |
| 57-26658 | 6/1982 | Japan . |

Primary Examiner—Kenneth Bomberg
Attorney, Agent, or Firm—Trexler, Bushnell, Giangiorgi & Blackstone, Ltd.

[57] ABSTRACT

A dispensing lid assembly for use with a container assembly and a container assembly including the lid assembly. The lid assembly can be attached to a container liner of the container assembly. The lid assembly includes a spigot housing through which liquids are dispensed. The spigot housing is configured with a grip portion which facilitates tipping of the container assembly with the lid assembly attached thereto. A dispensing conduit is provided in the lid assembly which communicates with a cavity in the container liner. A spring loaded valve assembly is retained in the spigot housing to controllably dispense liquids from the container liner through the dispensing conduit. A check valve assembly is included in the lid assembly. The check valve assembly provides controlled introduction of air into the container to equalize the pressure in the cavity during dispensing. The container assembly also includes a bottom or foot which is partially rounded to facilitate tipping of the container assembly to place a nozzle of the lid assembly in a dispensing position and to return the assembly to an upright position to prevent dripping.

34 Claims, 6 Drawing Sheets

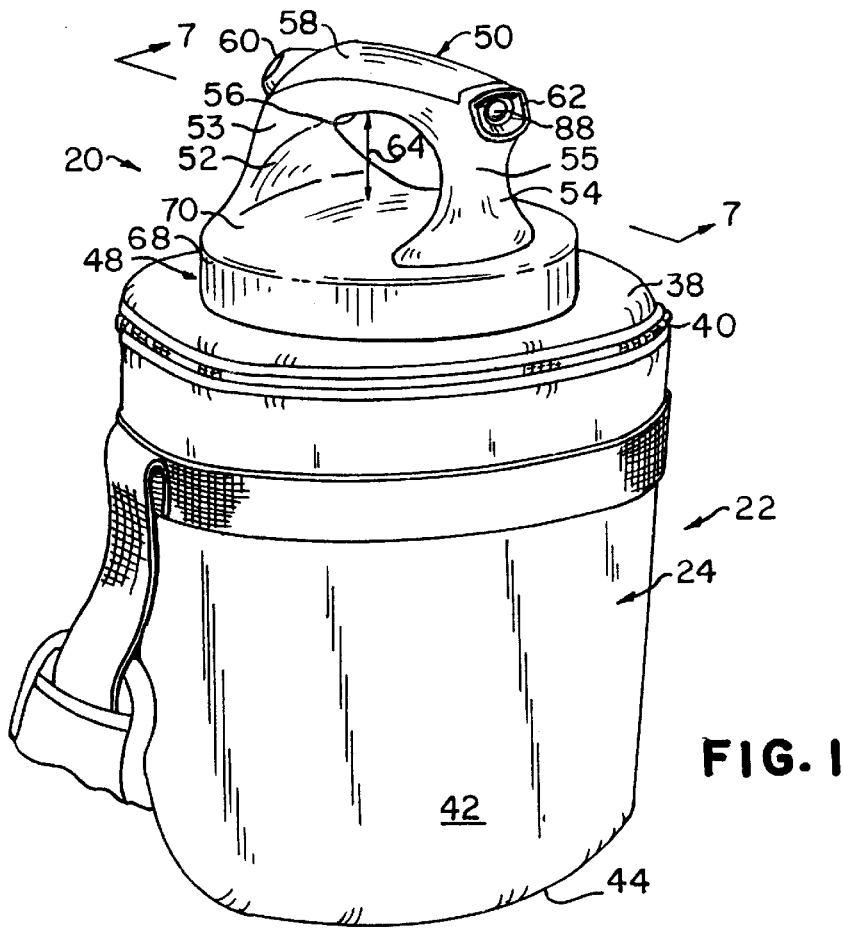
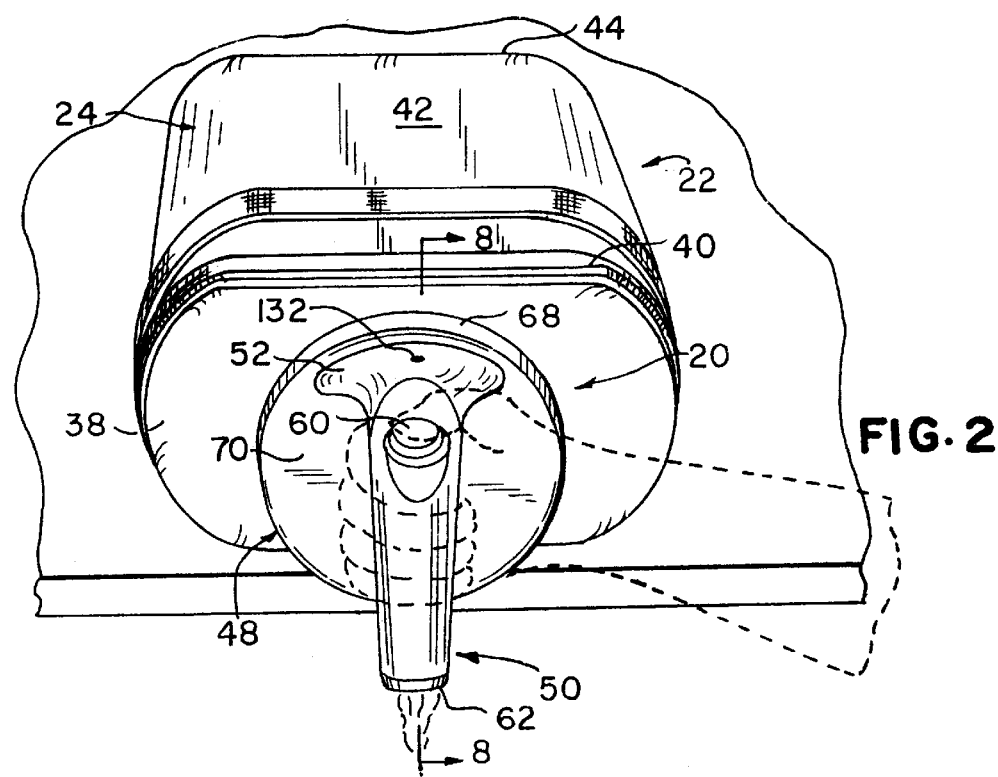

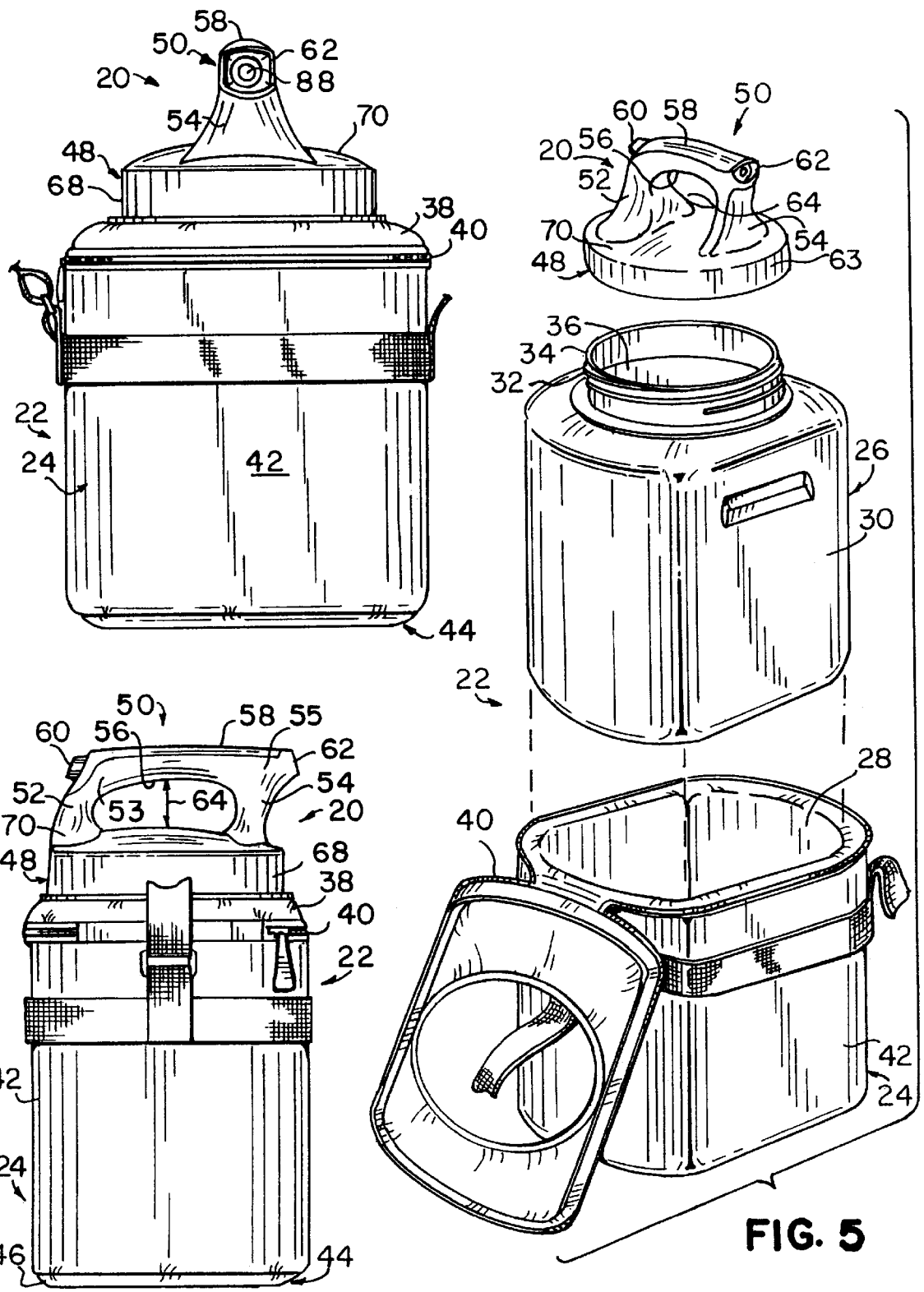

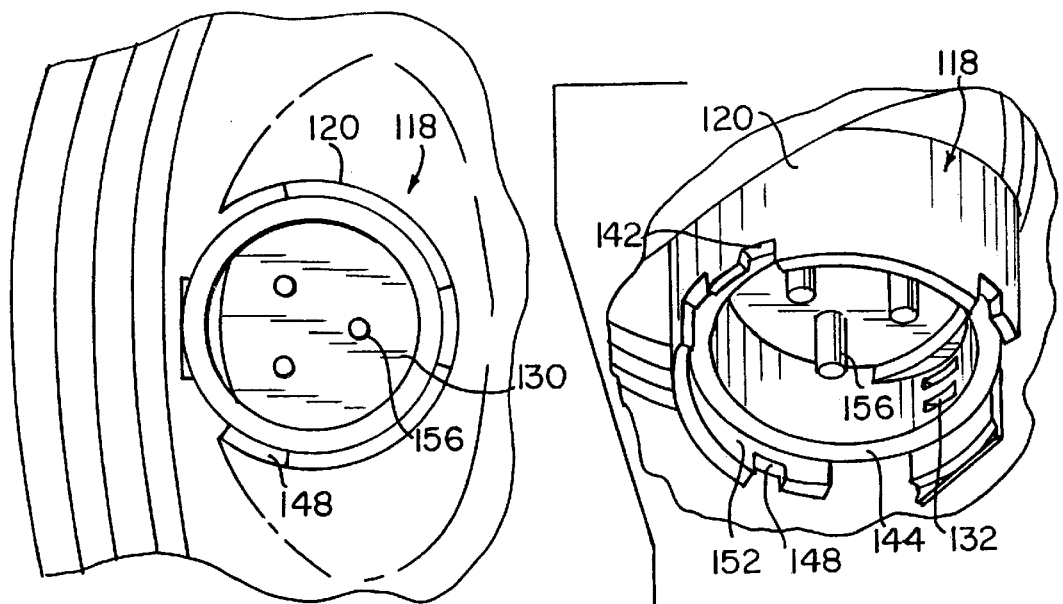
FIG. 9
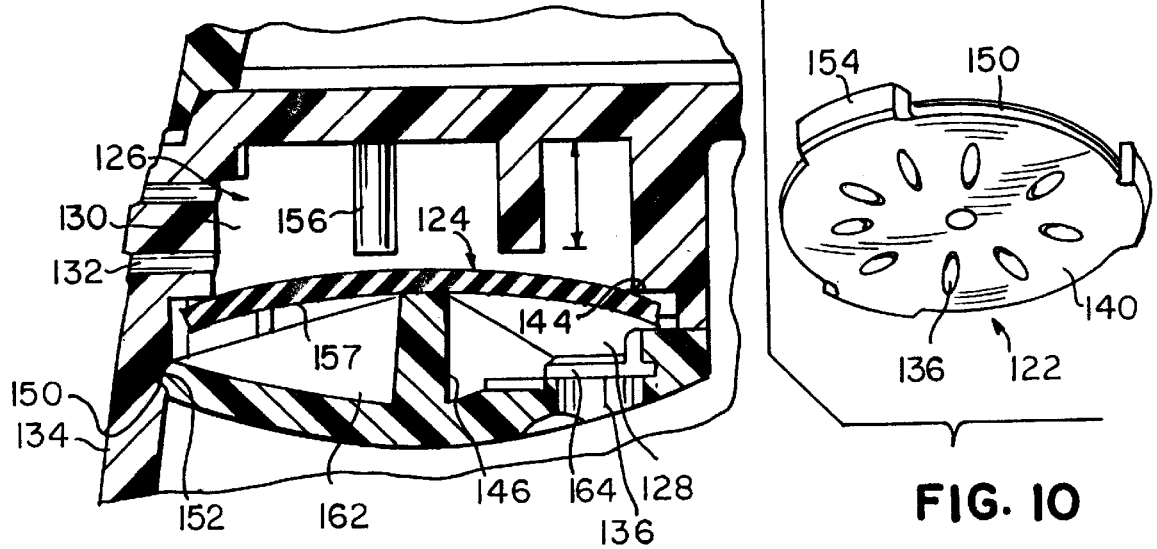
FIG. 11
FIG. 10

INSULATED VESSEL WITH HANDLE AND DISPENSING SPOUT

BACKGROUND

The present invention envisions an insulated container assembly including a dispensing lid assembly which is used for moving the container assembly as well as dispensing liquids from the container assembly.

Prior art insulated containers are generally of a rigid construction. In particular, numerous insulated containers are produced from rigid materials such as aluminum, rigid plastic, and styrofoam. One of the problems encountered with these rigid insulated containers is that they are somewhat heavy and become quite heavy, especially when they are filled with a liquid or items to be maintained in a cooled state which may include the use of ice or ice substitutes. These containers can be heavy because they are designed with a double-walled construction to provide insulating characteristics. As such, the weight of the essential container structure is doubled as the result of this double-walled construction.

The resulting filled rigid container can be quite burdensome to carry. As a result of the difficulty in transporting such rigid containers, damage may occur as a result of normal use. Damage may include dents and ruptures in the outer wall which might be lessened or eliminated if the container were not as difficult to transport.

Additionally, carrying rigid containers could be painful to the carrier or nearby persons if bumped by the container. An example might be a thermal bottle, which is a generally rigid container which could be painful if bumped against another person. Containers such as large volume liquid dispensing containers are difficult to lift and carry. One reason for difficulty is that these containers are typically round, barrel-type structures which are awkward and cumbersome to lift and carry.

As a further consideration, some prior art containers are subject to internal damage as well. For example, thermal bottles, mentioned above, are subject to internal damage in the form of breakage. It is well known that most thermal bottles include a glass vacuum chamber inside of a metal casing to provide insulating characteristics. While such an assembly is efficient at maintaining a desired temperature of the contents, such glass vacuum liners are subject to rupture and breakage as a result of impact.

Yet an additional problem associated with the prior art containers is that they are difficult to dispense from as a result of being cumbersome and do not include appropriate grips and supports for dispensing. Further, many prior art containers are not configured to provide drip-free dispensing. A commonly known liquid container includes a push-button spigot positioned in the lower portion of the container. The container is in the form of a large barrel-like structure, and the positioning of the spigot at the bottom allows for dispensing fluids therefrom under gravity induced pressure.

One of the problems that occurs is that as the valve components wear or as the result of improper fit, the spigot tends to drip. This is extremely undesirable when such a container is used to dispense beverages in an indoor setting. The dripping beverages can stain floor surfaces and require clean up. Additionally, a dripping spigot can cause the contents to drip in cars and other vehicles in which such containers might be transported.

OBJECTS AND SUMMARY

An object of the present invention is a lid assembly for use with a container assembly to provide controlled dispensing of liquids through the lid assembly.

Another object of the present invention is a container assembly which provides drip-free dispensing of liquids therefrom.

Another object of the present invention is a lid assembly which includes a check valve assembly to provide controlled equalization of pressure in the container assembly.

Briefly, and in accordance with the foregoing, the present invention envisions a lid assembly for use with a container assembly and a container assembly including the lid assembly. The lid assembly can be attached to a container liner of the container assembly. The lid assembly includes a spigot housing through which liquids may be dispensed. The spigot housing is configured with a grip portion to facilitate tipping of the container assembly with the lid assembly attached thereto. A dispensing conduit is provided in the lid assembly and communicates with a cavity in the container liner. A spring loaded valve assembly is retained in the spigot housing to controllably dispense liquids from the container liner through the dispensing conduit. A check valve assembly is included in the lid assembly. The check valve assembly provides controlled introduction of air into the container to equalize the pressure in the cavity during dispensing. The container assembly also includes a bottom or foot which is partially rounded to facilitate tipping of the container assembly to place a nozzle of the lid assembly in a dispensing position and return the assembly to an upright position to prevent dripping.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 1 is a top, left, perspective view of a dispensing lid assembly and container assembly of the present invention;

FIG. 2 is a top, front, perspective view of the dispensing lid assembly and container assembly of the present invention in which the container assembly is positioned on a side thereof with a nozzle of the lid assembly positioned in a downward orientation to dispense liquids from the container assembly;

FIG. 3 is a front elevational view of the lid assembly and container assembly of the present invention;

FIG. 4 is a side elevational view of the lid assembly and container assembly of the present invention showing an arcuate foot portion of the container assembly which facilitates tipping in order to achieve the position as shown in FIG. 2;

FIG. 5 is an exploded, top, left, front side, perspective view of the container a assembly and dispensing lid assembly of the present invention;

FIG. 9 is a top plan view of a check valve housing;

FIG. 10 is an exploded perspective view of a check valve assembly including a valve housing, a cover grate attachable to the valve housing and a flexible diaphragm retained therebetween; and FIG. 11 is an enlarged, partial fragmentary, cross-sectional, side elevational view of the check valve assembly.

DESCRIPTION

Figure 6:
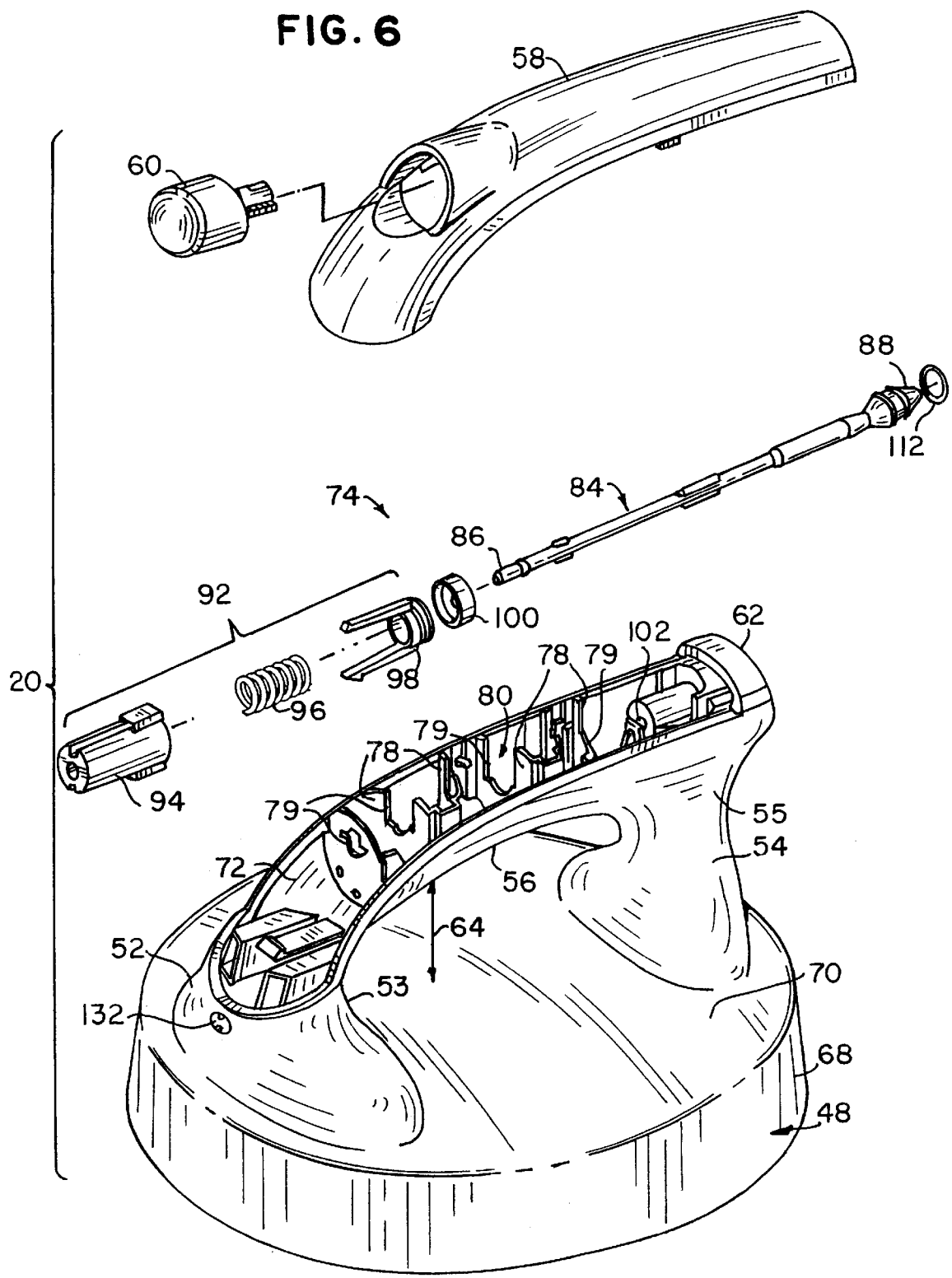
FIG. 6 is an enlarged, exploded, top, rear, left side, perspective view of the dispensing lid assembly showing a cover and a spring loaded valve assembly exploded from spigot housing attached to a base portion of the lid assembly.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

With reference to FIGS. 1–5, a brief description of the overall structure of a At dispensing lid assembly 20 of the present invention in combination with a container assembly 22 will be provided. In general, with reference to FIG. 5, the container assembly 22 includes an insulated jacket 24 and a container liner 26 which fits in a cavity 28 of the insulated jacket 24. As can be seen in the figures, the container liner 26 includes walls 30 which extend upwardly and terminate in a neck 32 which define a mouth 34 of the container 26. Also, a cavity 36 is defined inside the container 26. The dispensing lid assembly 20 attaches to the neck 32 of the container 26. In the assembled view as shown in FIGS. 1, 3, and 4 a hood 38 of the insulated jacket 24 fits over the dispensing lid assembly 20 and attaches with a closure structure 40 shown herein as a zipper. The hood 38 retains the container 26 with the lid assembly 20 attached thereto in the insulated jacket 24.

When assembled as shown in FIGS. 1–4, and filled with a liquid, the dispensing lid assembly 20 attached to the container assembly 22 can be tipped on a broad side 42 to dispense a liquid therefrom. This dispensing position is specifically shown in FIG. 2. This dispensing characteristics of the present invention are advantageous such that the container assembly 22, with the dispensing lid 20 attached thereto, can be tipped on its broad side 42 to dispense liquid and returned to an upright position on a base or foot 44 to prevent dripping from the dispensing lid assembly 20. As shown in the side view of FIG. 4, the foot 44 includes a partially arcuate or rounded portion 46 which helps to facilitate tipping from the upright position (see FIGS. 1, 3 and 4) to the dispensing position (see FIG. 2). While the curve on the foot 44 is sufficient to promote tipping, it as a small enough radius to prevent tipping when the container is unattended in the upright position. In this regard, manual force is required in order to tip the container on the broad side 42 for dispensing.

In this regard, once liquid is dispensed, the container can be pivoted or positioned in the upright position as shown in FIG. 1. In the upright position, there is no hydrostatic force or head on the dispensing lid assembly 20, and therefore, dripping will be prevented. In the downwardly positioned or dispensing position as shown in FIG. 2, a hydrostatic force develops against the lid assembly 20 to promote gravity flow of liquid from the container assembly 22.

The dispensing lid assembly 20 as will be described in greater detail hereinbelow, provides novel structures which facilitate dispensing of liquids from the container assembly 22 through the lid assembly 20. The lid assembly 20 includes a base 48 and a spigot housing 50 attached to and spaced away from the base 48. As specifically shown in FIGS. 1, 4–8 of the present invention, the spigot housing 50 is spaced from the base 48 by an upper strut 52 connected to an upper portion 53 of the spigot housing 50 and a lower strut 54 connected to a lower portion 55 of the spigot 50. The spigot housing 50 includes a grip portion 56, a cover 58, a control button 60 and a nozzle 62. The upper and lower struts 52,54 space the grip portion 56 away from the base 48 defining a gap 64 therebetween.

Figure 7:
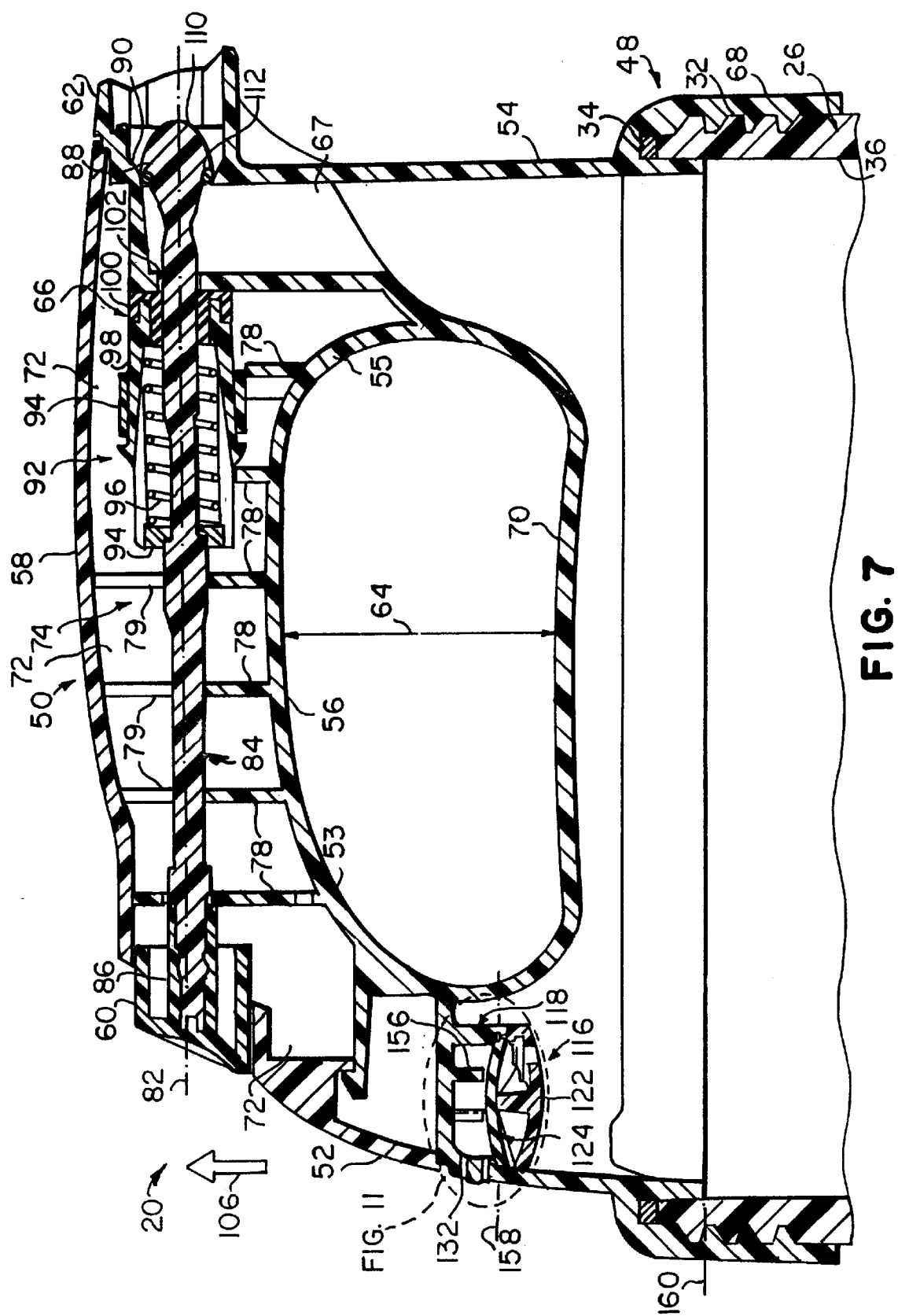
FIG. 7 is an enlarged, partial fragmentary, cross-sectional, side elevational view taken along line 7—7 in FIG. 1 showing the lid assembly in an upright position.
Figure 8:
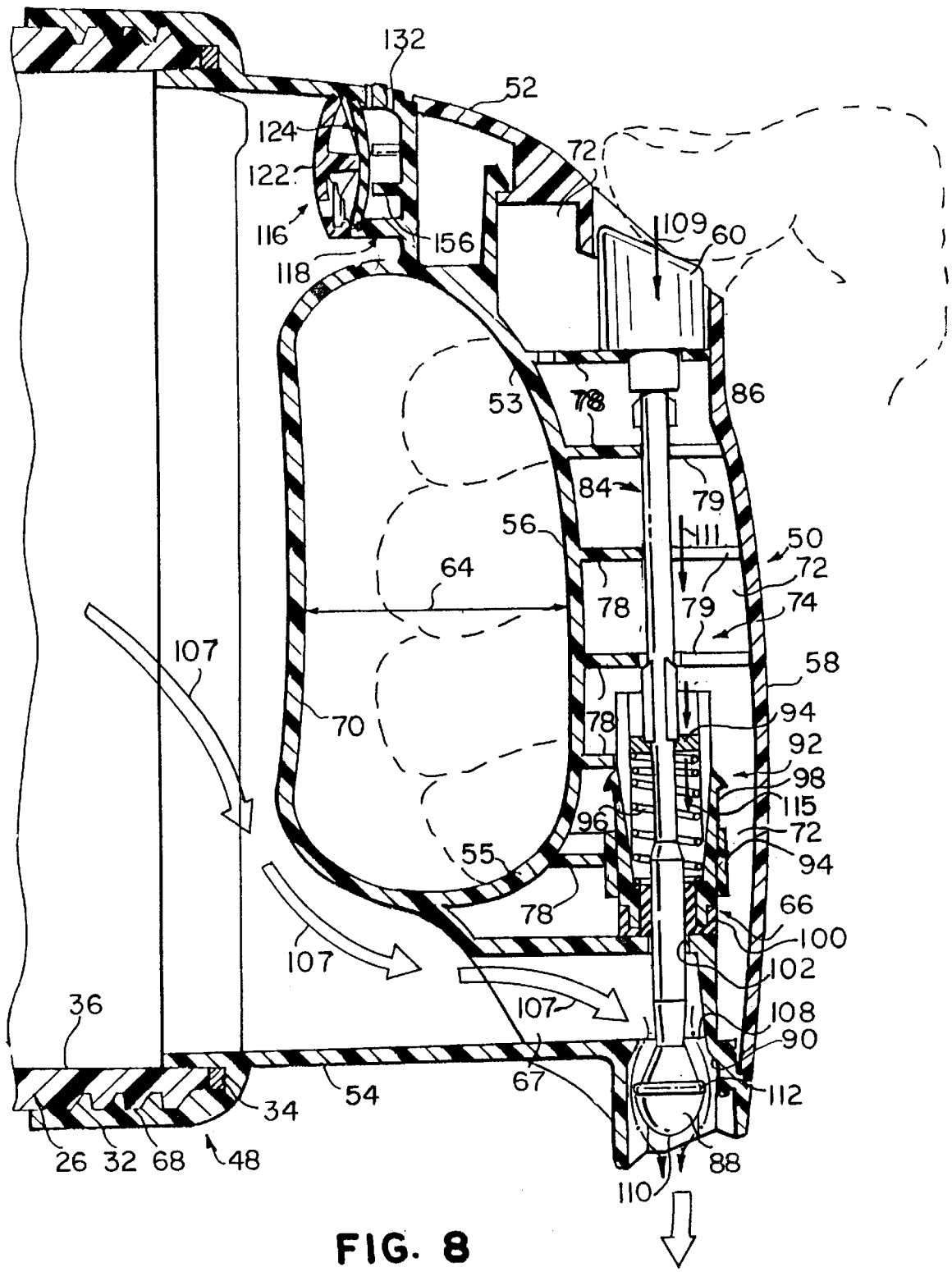
FIG. 8 is an enlarged, partial fragmentary, cross-sectional, side elevational view taken along line 8—8 in FIG. 2 in which the container assembly and lid assembly have been positioned on a side and in which the spring loaded valve assembly has been displaced to open a dispensing port between the dispensing conduit and a nozzle.

As shown in FIG. 2, a user (a user's hand is shown in phantom line in FIG. 2) can extend their fingers through the gap 64 and grasp the grip portion 56. A thumb is placed on the control button 60. By applying pressure to the control button 60, a valve assembly 66 (as shown in FIGS. 7 and 8) is operated to dispense liquids through the nozzle 62. It should be noted that the valve assembly 66 includes a spring loaded plunger assembly 74, the nozzle 62, and a dispensing conduit 67 which controllably communicates with the nozzle 62 and also communicates with the cavity 36 of the container 26.

Having now briefly described the overall structure and function of the invention, greater detail is provided with regard to the specific structures and functions of the dispensing lid assembly 20. As shown in FIGS. 6–8, the dispensing lid assembly 20 includes the base 48 which is defined generally by side walls 68 which are connected to a head portion 70. As shown, the struts 52,54 extend from the base portion 48 to space the grip portion 56 away from the base portion 48. As particularly shown in FIG. 6, the grip portion 56 defines a housing cavity 72 which is a generally hollow area and contains the spring biased plunger assembly 74. The cover 58 is positioned over the housing cavity 72 for retaining the spring biased plunger assembly 74 therein.

Multiple reinforcing ribs 78 are also provided in the housing cavity 72. These ribs 78 are formed with individual passages 79 or gaps which define an axial activation passage 80 which receive the spring biased plunger assembly 74. The specific operation of the spring biased plunger assembly 74 retained in the spigot housing 50 will be described in greater detail hereinbelow. Arrangement of the spring biased plunger assembly 74 within the spigot housing 50 is generally along a valve axis 82.

One of the main components of the spring biased plunger assembly 74 is an actuator or plunger rod 84. As can be seen, the plunger rod 84 is an axially elongated structure having a tip 86 at one end and a bulbous head 88 at an opposite end. With reference to FIGS. 7 and 8, the plunger rod 84 extends along the valve axis 82 through the axial activation passage 80 defined by the ribs 78. The bulbous head 88 engages a valve seat 90 of the nozzle 62.

Operation, or displacement and resealing of the bulbous head 88 of the plunger rod 84 is achieved by a spring mechanism 92. The spring mechanism 92 as specifically shown in the drawings includes a spring housing 94 in which is retained a spring 96 by a displaceable clasp 98 which engages the spring housing 94. The spring 96 is retained in a partially compressed condition between the displaceable clasp 98 and the spring housing 94. A sealing washer 100 is provided on the spring mechanism 92 to prevent leakage through an aperture 102 through which the plunger rod 84 extends. As shown in FIG. 7, the spring biased plunger assembly 74 is positioned to seal the valve seat 90. In this position, the valve assembly 66 is in the rest or deactivated position. In this partially compressed condition the plunger rod is loaded to retain the head 88 in a sealing position in the valve seat.

The directional arrow 106 shown in FIG. 7 indicates that the dispensing lid assembly 20 is in the upright position thereby preventing dripping through the valve assembly 66 as a result of the valve assembly 66 being oriented in an uppermost position. Turning to FIG. 8, it can be seen that the dispensing lid assembly 20 and the container assembly 22 have been tipped into the dispensing position as shown in FIG. 2. In this position, liquid (as indicated by arrows 107) flows from the cavity 36 through the dispensing conduit 67. A user applies force (arrow 109) to the push button 60 which is attached to the tip 86 of the plunger rod 84. The force (arrow 111) is translated axially 82 along the plunger rod 84 to displace the spring housing 94 (arrow 113) and compress the spring 96. Thumb action on the push button 60 results in displacement of the bulbous head 88 from the valve seat 90 to open a dispensing port 108. With the dispensing port 108 opened, the dispensing conduit 67 communicates with the nozzle 62. As a result, fluid flows from the cavity 36 through the dispensing conduit 67, and through the nozzle 62.

The bulbous head 88 is formed with a tapering rounded tip 110. The bulbous head and tip function to provide a structure which draws the water back into a stream as it exits through the nozzle 62. An o-ring gasket 112 is carried on the backside of the bulbous head to form a tight seal in the valve seat 90. As can be seen in FIG. 8, the nozzle 62 is in the lowermost position when the container assembly 22 is tipped onto the broad side 42.

The present invention also includes a check valve assembly 116 as shown generally in FIGS. 7 and 8 and shown in greater detail in FIGS. 9–11. The check valve assembly 116 provides controlled introduction of air from the ambient atmosphere into the cavity 36 defined by the container walls 30. By introducing air into the cavity 36, the check valve assembly 116 provides controlled equalization of the pressure in the cavity 36. This is an improvement over the prior art containers which tended to either draw in the walls of a flexible walled container which can cause a pulsed dispensing of liquids from the container or have a manually operated valve of known construction which is prone to leaking. The check valve assembly 116 of the present invention introduces air to facilitate a generally continuous flow of liquid from the container through the dispensing lid assembly 20 since equalizing air is introduced through the valve and not through the spigot housing and because equalizing occurs thereby reducing the vacuum forces on the container walls.

With reference to FIGS. 7–11, the check valve assembly 116 includes a housing portion 118 generally defined by a wall 120, a cover or grate 122 and a diaphragm 124 retained in a valve chamber 126 defined between the grate 122 and the housing 118. The valve chamber 126 is divided into an interior chamber 128 and an exterior chamber 130. A vent port 132 extending through a wall 134 of the base portion 48 provides communication between the exterior chamber 130 and the ambient atmosphere. On the other side of the diaphragm 124, holes 136 in a face wall 140 of the grate 122 and breather ports 142 in the wall 120 of the housing 118 provide communication between the cavity 36 and the interior chamber 128.

With further reference to FIGS. 7, 8, 10 and 11, the diaphragm 124 is positioned on a sealing structure 144 on an interior surface of the housing 118. The sealing structure 144 is in the form of a shoulder. A preloading protrusion 146 extends from an interior surface of the grate 122 and contacts the diaphragm 124 to apply preloading forces to the diaphragm 124. The preloading forces deflect the diaphragm 124 to increase the forces between the diaphragm 124 and the sealing structure 144. Depending upon the variables in any given situation, the length of the preloading protrusion 146 and the desired degree of deflection of the diaphragm 124 can be selected to provide a desired sealing force between the diaphragm 124 and the sealing structure 144. In other words, a vacuum developed within the cavity 36 will have to achieve a level of force slightly greater than the preloading forces on the diaphragm 124 at the sealing structure 144 to unseat the diaphragm 124 from the sealing structure 144. Once unseated, the diaphragm 124 allows air to pass from the exterior chamber 130 to the interior chamber 128 and the cavity 36.

The breather ports 142 are defined by gaps 148 in the wall 120. An annular rib 150 is provided on the perimeter of the grate 122 and engages a cooperatively formed groove 152 on the wall 120 of the housing 118. Legs 154, extend from the perimeter of the grate 122. While there are a number of holes 136 in the face wall 140, air actually tends to flow through the breather ports 142. The breather ports 142 are positioned in close proximity to the shoulder 144 and as such provide for a short flow path through the check valve assembly 116. As air is drawn from the exterior chamber 130 and through the breather ports 142, the inhaling forces tend to decrease and once they fall below the seating forces of the diaphragm 124 on the sealing structure 144, the check valve 116 closes.

As specifically shown in FIGS. 7, 8, 10 and 11, the check valve assembly 116 of the present invention also includes standoff protrusions 156. The standoff protrusions 156 extend in the exterior chamber 130 towards the diaphragm 124 in opposition to the preloading protrusion 146. The standoff protrusions 156 are provided in order to provide an increased width of the exterior chamber 130 to accommodate vent ports 132 which are positioned generally perpendicular to the diaphragm 124. In this regard, it can be seen in FIG. 7 that the diaphragm 124 is positioned in a plane 158 which is generally parallel to a plane of the base 160. The vent ports 132 define a plane which is generally positioned perpendicular to these planes 158,160. The standoffs 156 prevent the diaphragm 124 from collapsing inwardly towards the exterior chamber 130 under hydrostatic forces or other pressure which may buildup in the cavity 36. The overall structure of the check valve 116 as used in the present invention is important in order to facilitate the tipped dispensing position as shown in FIG. 2. In the dispensing position as shown in FIG. 2, the vent ports 132 are placed in uppermost position thereby facilitating the equalization of the pressure outside and inside of the container.

To additionally control the flow of air and the deformation of the diaphragm 124, tapered ribs 162 and stop walls 164 are provided on the grate 122. The ribs 162 prevent over-deflection and crumpling of the diaphragm 124 and promote uniform deflection of the diaphragm 124. The stop walls 164 limit the extent of deflection of the diaphragm when unseated from the sealing structure 144.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

The invention claimed is:

1. A dispensing lid assembly for use with a container having walls which extend upwardly and terminate in a neck, said neck defining a mouth of the container, the dispensing lid assembly comprising:

a base portion capable of attachment to said container neck so that said base portion is retained over said container mouth, said base portion also being adapted for removal from said container neck;

a spigot housing attached to and spaced away from said base;

a valve assembly retained in said spigot housing to control dispensing of liquids from said container through a portion of said spigot housing, said valve assembly including a dispensing conduit for communicating with a cavity defined by the container, a nozzle communicating with said dispensing conduit, and a spring loaded plunger assembly retained in said spigot housing for controllably opening and closing a flow path from said dispensing conduit to said nozzle, said spring loaded plunger assembly including a spring which is inside said spigot housing;

a control button generally coaxial with and operatively coupled to said valve assembly; and a check valve located between said spigot housing and said base portion for allowing air to flow from exterior of the lid assembly into the container during dispensing, said check valve having an air path which is mutually exclusive from the dispensing conduit and nozzle.

2. A dispensing lid assembly as recited in claim 1, in combination with a container having deflectable side walls.

3. A dispensing lid assembly as recited in claim 1, wherein said spigot housing is elongated with said spring loaded plunger assembly being retained and generally axially displaceable therein, a valve seat being positioned between said dispensing conduit and said nozzle, said spring loaded plunger assembly contacting and sealing against said valve seat to prevent flow from said dispensing conduit through said nozzle.

4. A dispensing lid assembly as recited in claim 1, said spring loaded plunger assembly further comprising:

an axially elongated plunger rod extending through said spigot housing;

a head portion of said plunger rod engaging a valve seat between said dispensing conduit and said nozzle; and said spring being coupled to said plunger rod and being loaded to retain said head portion in a sealing position in said valve seat.

5. A dispensing lid assembly as recited in claim 4, said spring mechanism further comprising:

a spring housing;

said spring retained in said spring housing; and a displaceable clasp displaceably engaged with said spring housing retaining said spring in a partially compressed condition.

6. A dispensing lid assembly as recited in claim 1, further comprising:

at least one strut connected to and extending between said spigot housing and said base, said strut spacing said spigot housing away from said base and providing a gap between said spigot housing and said base.

7. A dispensing lid assembly as recited in claim 6, wherein a grip portion on said spigot housing is spaced away from said base by said strut.

8. A dispensing lid assembly as recited in claim 1, further comprising:

an upper strut connected to an upper portion of said spigot housing; and a lower strut connected to a lower portion of said spigot housing, said upper strut and said lower strut being spaced apart, a gap being defined between said spigot housing and said base said dispensing conduit being in said lower strut for communicating with the cavity of the container and being controllably sealed by said valve assembly in said spigot housing to control dispensing of fluids from the cavity through the dispensing conduit.

9. A dispensing lid assembly as recited in claim 8, further comprising:

said check valve being retained in said upper strut for providing controlled passage of air therethrough into the cavity of said container which communicates with the upper strut.

10. A dispensing lid assembly as recited in claim 1, said check valve further comprising:

a vent extending through a wall portion of said dispensing lid assembly and spaced away from said nozzle of said spigot housing, a valve housing, a valve cover attached to said valve housing, and a flexible diaphragm retained between said cover and said valve housing.

11. A dispensing lid assembly as recited in claim 10, wherein said base defines a base plane, said diaphragm generally defines a diaphragm plane with said diaphragm plane being oriented generally parallel to said base plane, and a vent port defines a vent port plane being oriented generally perpendicular to said diaphragm plane and said base plane.

12. A dispensing lid assembly as recited in claim 10, said check valve further comprising:

said valve housing defining a valve chamber, a sealing structure in said valve chamber, said diaphragm abutting said sealing structure to provide a seal therebetween; and a preloading protrusion extending from said cover inwardly into said valve chamber for pressing against said diaphragm, said preloading protrusion forcing said diaphragm against said sealing structure to provide a desired sealing force between said sealing structure and said diaphragm.

13. A dispensing lid assembly as recited in claim 12, said check valve further comprising:

at least one standoff extending into said valve chamber positioned in opposition to said preloading protrusion, said at least one standoff preventing a collapse of said diaphragm into said valve chamber.

14. A dispensing lid assembly as recited in claim 13, said check valve further comprising:

a breather port in said check valve being positioned in close proximity to a perimeter of said diaphragm to facilitate transfer of air therethrough upon drawing air through said check valve assembly.

15. A dispensing lid assembly as recited in claim 1, further comprising:

a grip portion of said spigot housing defining a housing cavity spaced away from said base;

reinforcing ribs being retained on an inside portion of said spigot housing;

said ribs defining an axial activation passage for receiving said valve assembly therethrough;

a cover attached to said grip portion to retain said valve assembly in said spigot housing.

16. A dispensing lid assembly as recited in claim 15, further comprising:

said control button attached to said valve assembly such that said control button is positioned for controllably operating said valve assembly connected thereto while gripping said grip portion.

17. A dispensing lid assembly in combination with a container assembly comprising:
- a container of said container assembly having walls terminating in a neck and defining a cavity therein, with an upper edge of said walls defining a mouth;
- a base portion of said dispensing lid assembly releasably attached to said container neck to cover said mouth;
- a spigot housing attached to said base portion and spaced therefrom;
- a valve assembly retained in said spigot housing to controllably dispense liquids retained in said cavity of said container through said spigot housing;
- said valve assembly including a spring loaded plunger assembly wherein a spring is inside said spigot housing;
- a control button generally coaxial with and operatively coupled to said valve assembly;
- a check valve located between said spigot housing and said base portion for allowing air to flow from exterior of the lid assembly into the container during dispensing, said check valve having an air path which is mutually exclusive from the dispensing conduit and nozzle; and
- said container assembly having at least one broad side, said container assembly and dispensing lid assembly attached thereto being positionable on said broad side for dispensing fluids through said spigot housing of said dispensing lid assembly, said container assembly and dispensing lid assembly attached thereto being positioned in an upright position to prevent dripping from said spigot housing.

18. A dispensing lid assembly in combination with a container assembly as recited in claim 17, further comprising a partially arcuate portion on a foot of said container assembly for facilitating tipping of said container assembly with said dispensing lid assembly attached thereto.

19. A dispensing lid assembly in combination with a container assembly as recited in claim 17, further comprising:
- said check valve being retained on said dispensing lid assembly for providing controllable passage of air therethrough to equalize a vacuum created in the cavity of the container upon dispensing the liquid therefrom.

20. A dispensing lid assembly in combination with a container assembly as recited in claim 17, wherein said base and a grip portion of said spigot housing being an integral single piece structure.

21. A dispensing lid assembly in combination with a container assembly as recited in claim 17, further comprising:
- said valve assembly including a dispensing conduit communicating with said cavity, a nozzle communicating with said dispensing conduit, and said spring-loaded plunger assembly retained in said spigot housing for controllably opening and closing a flow path from said dispensing conduit to said nozzle, a valve seat positioned between said dispensing conduit and said nozzle;
- said spigot housing being axially elongated for receiving said spring loaded plunger assembly with said spring loaded plunger assembly being axially displaceable in said spigot housing; and
- said spring loaded plunger assembly having an axially elongated plunger rod extending through said spigot housing, a head portion of said plunger rod engaging said valve seat, and said spring coupled to said plunger rod and being loaded to retain said head portion in a sealing position in said valve seat, whereby said spring loaded plunger assembly controllably contacts and disengages said valve seat to prevent and permit flow from said dispensing conduit through said nozzle.

22. A dispensing lid assembly attached to a container assembly as recited in claim 21, said head of said plunger rod being bulbous and ending in a slightly arcuate tip to draw water being dispensed through said valve seat into a stream.

23. A dispensing lid assembly in combination with an insulated container assembly comprising:
- said insulated container assembly including an insulated jacket and a container liner retained in said insulated jacket, said container liner having walls terminating in a neck and defining a cavity therein, with an upper edge of said walls defining a mouth;
- a base portion of said dispensing lid assembly releasably attached to said container neck to cover said mouth;
- a spigot housing attached to said base portion and spaced therefrom;
- a valve assembly retained in said spigot housing to controllably dispense liquids retained in said cavity of said container through said spigot housing;
- said valve assembly including a spring loaded plunger assembly wherein a spring is inside said spigot housing;
- a control button generally coaxial with and operatively coupled to said valve assembly;
- a check valve located between said spigot housing and said base portion for allowing air to flow from exterior of the lid assembly into the container during dispensing, said check valve having an air path which is mutually exclusive from the dispensing conduit and nozzle; and
- said container assembly having at least one broad side, said container assembly and dispensing lid assembly attached thereto being positionable on said broad side for dispensing fluids through said spigot housing of said dispensing lid assembly, said container assembly and dispensing lid assembly attached thereto being positioned in an upright position to prevent dripping from said spigot housing.

24. A dispensing lid assembly in combination with an insulated container assembly as recited in claim 23, further comprising a partially arcuate portion on a foot of said container assembly for facilitating tipping of said container assembly with said dispensing lid assembly attached thereto from an upright position to said side position for dispensing a liquid therefrom.

25. A dispensing lid assembly in combination with an insulated container assembly as recited in claim 23, further comprising:
- said check valve being retained on said dispensing lid assembly for providing controllable passage of air therethrough to equalize a vacuum created in the cavity of the container upon dispensing the liquid therefrom.

26. A dispensing lid assembly in combination with an insulated container assembly as recited in claim 23, wherein said base and a grip portion of said spigot housing being an integral single piece structure.

27. A dispensing lid assembly in combination with an insulated container assembly as recited in claim 23, further comprising:
- said valve assembly including a dispensing conduit communicating with said cavity, a nozzle communicating with said dispensing conduit, and said spring-loaded plunger assembly retained in said spigot housing for controllably opening and closing a flow path from said dispensing conduit to said nozzle, a valve seat positioned between said dispensing conduit and said nozzle;

said spigot housing being axially elongated for receiving said spring loaded plunger assembly with said spring loaded plunger assembly being axially displaceable in said spigot housing; and said spring loaded plunger assembly having an axially elongated plunger rod extending through said spigot housing, a head portion of said plunger rod engaging said valve seat, and said spring coupled to said plunger rod and being loaded to retain said head portion in a sealing position in said valve seat, whereby said spring loaded plunger assembly controllably contacts and disengages said valve seat to prevent and permit flow from said dispensing conduit through said nozzle.

28. A dispensing lid assembly in combination with an insulated container assembly as recited in claim 27, said head of said plunger rod being bulbous and ending in a slightly arcuate tip to draw water being dispensed through said valve seat into a stream.

29. A dispensing lid assembly for use with a container having walls which extend upwardly and terminate in a neck, said neck defining a mouth of the container, the dispensing lid assembly comprising:

a base portion capable of attachment to said container neck so that said base portion is retained over said container mouth, said base portion also being adapted for removal from said container neck;

a spigot housing attached to and spaced away from said base; and a valve assembly retained in said spigot housing to control dispensing of liquids from said container through a portion of said spigot housing, said valve assembly including a dispensing conduit for communicating with a cavity defined by the container, a nozzle communicating with said dispensing conduit, and a spring loaded plunger assembly retained in said spigot housing for controllably opening and closing a flow path from said dispensing conduit to said nozzle, said spring loaded plunger assembly further comprising:

an axially elongated plunger rod extending through said spigot housing;

a head portion of said plunger rod engaging a valve seat between said dispensing conduit and said nozzle; and a spring mechanism coupled to said plunger rod and being loaded to retain said head portion in a sealing position in said valve seat, said spring mechanism further comprising:

a spring housing;

a spring retained in said spring housing; and a displaceable clasp displaceably engaged with said spring housing retaining said spring in a partially compressed condition.

30. A dispensing lid assembly for use with a container having walls which extend upwardly and terminate in a neck, said neck defining a mouth of the container, the dispensing lid assembly comprising:

a base portion capable of attachment to said container neck so that said base portion is retained over said container mouth, said base portion also being adapted for removal from said container neck;

a spigot housing attached to and spaced away from said base; and a valve assembly retained in said spigot housing to control dispensing of liquids from said container through a portion of said spigot housing, said valve assembly including a dispensing conduit for communicating with a cavity defined by the container, a nozzle communicating with said dispensing conduit, and a spring loaded plunger assembly retained in said spigot housing for controllably opening and closing a flow path from said dispensing conduit to said nozzle;

a check valve retained on said dispensing lid assembly for providing controllable passage of air therethrough to equalize a vacuum created in the cavity of said container upon dispensing liquid therefrom, said check valve further comprising:

a vent extending through a wall portion of said dispensing lid assembly and spaced away from the nozzle of said spigot housing, a valve housing, a valve cover attached to said valve housing, and a flexible diaphragm retained between said cover and said valve housing.

31. A dispensing lid assembly as recited in claim 30, wherein said base defines a base plane, said diaphragm generally defines a diaphragm plane with said diaphragm being oriented generally parellel to said base plane, and a vent port defines a vent port plane being oriented generally perpendicular to said diaphragm plane and said base plane.

32. A dispensing lid assembly as recited in claim 30, said check valve further comprising:

said valve housing defining a valve chamber, a sealing structure in said valve chamber, said diaphragm abutting said sealing structure to provide a seal therebetween; and a preloading protrusion extending from said cover inwardly into said valve chamber for pressing against said diaphragm, said preloading protrusion forcing said diaphragm against said sealing structure to provide a desired sealing force between said sealing structure and said diaphragm.

33. A dispensing lid assembly as recited in claim 32, said check valve further comprising:

at least one standoff extending into said valve chamber positioned in opposition to said preloading protrusion, said at least one standoff preventing a collapse of said diaphragm into said valve chamber.

34. A dispensing lid assembly as recited in claim 33, said check valve further comprising:

a breather port in said check valve being positioned in close proximity to a perimeter of said diaphragm to facilitate transfer of air therethrough upon drawing air through said check valve assembly.

* * * * *